US010243388B2

(12) United States Patent
Shin et al.

(10) Patent No.: US 10,243,388 B2
(45) Date of Patent: Mar. 26, 2019

(54) CHARGING SYSTEM USING WOUND ROTOR SYNCHRONOUS MOTOR

(71) Applicants: HYUNDAI MOTOR COMPANY, Seoul (KR); Kia Motors Corporation, Seoul (KR); Seoul National University R&DB Foundation, Seoul (KR)

(72) Inventors: Ho Joon Shin, Uiwang-si (KR); Mu Shin Kwak, Osan-si (KR); Young Kook Lee, Seoul (KR); Sung Kyu Kim, Bucheon-si (KR); Jung Ik Ha, Seoul (KR); Yong Su Han, Daejeon (KR)

(73) Assignees: HYUNDAI MOTOR COMPANY, Seoul (KR); KIA MOTORS CORPORATION, Seoul (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 15/382,262

(22) Filed: Dec. 16, 2016

(65) Prior Publication Data

US 2018/0115180 A1    Apr. 26, 2018

(30) Foreign Application Priority Data

Oct. 26, 2016  (KR) .................. 10-2016-0140223

(51) Int. Cl.
*H02J 7/02*     (2016.01)
*B60L 11/18*    (2006.01)
(Continued)

(52) U.S. Cl.
CPC ........... *H02J 7/022* (2013.01); *B60L 11/1811* (2013.01); *H02J 3/18* (2013.01); *H02J 7/0068* (2013.01);
(Continued)

(58) Field of Classification Search
CPC .. H02J 7/02; H02J 7/022; H02J 7/0027; H02J 7/0068; H02J 3/18; H02P 6/32;
(Continued)

(56) References Cited

U.S. PATENT DOCUMENTS

| 6,794,776 B1 * | 9/2004 | Gabrys ................. H02K 7/025 310/209 |
| 8,013,553 B2 * | 9/2011 | Taniguchi .............. H02P 25/22 318/400.27 |

(Continued)

FOREIGN PATENT DOCUMENTS

| JP | H09-298840 A | 11/1997 |
| JP | 2000060004 A | 2/2000 |

(Continued)

*Primary Examiner* — Rexford Barnie
*Assistant Examiner* — Terrence Willoughby
(74) *Attorney, Agent, or Firm* — McDonnell Boehnen Hulbert & Berghoff LLP (57) ABSTRACT

Disclosed herein is a charging system using a wound rotor synchronous motor, capable of increasing a battery charging capacity while reducing the volume, weight, and/or cost of a vehicle increased due to an on-vehicle charging circuit. The charging system includes an inverter converting a DC output of a battery into a plurality of AC signals having different phases, a wound rotor synchronous motor having a plurality of stator coils, to which the AC signals having different phases are respectively input, and a field coil forming a mutual inductance with the stator coils, the field coil being installed in a rotor to form a magnetic flux using the DC output of the battery, and a controller allowing the battery and the field coil to be insulated from each other in a charge mode in which electricity from a grid is applied to the field coil of the wound rotor synchronous motor.

13 Claims, 9 Drawing Sheets

(51) Int. Cl.

| | | |
|---|---|---|
| *H02J 3/18* | (2006.01) | |
| *H02J 7/00* | (2006.01) | |
| *H02K 1/14* | (2006.01) | |
| *H02K 1/24* | (2006.01) | |
| *H02K 19/12* | (2006.01) | |
| *H02P 23/14* | (2006.01) | |
| *H02P 27/06* | (2006.01) | |
| *H02P 6/32* | (2016.01) | |
| *H02J 7/24* | (2006.01) | |
| *H02P 101/45* | (2016.01) | |

(52) U.S. Cl.
CPC ............... *H02J 7/242* (2013.01); *H02K 1/14* (2013.01); *H02K 1/24* (2013.01); *H02K 19/12* (2013.01); *H02P 6/32* (2016.02); *H02P 23/14* (2013.01); *H02P 27/06* (2013.01); *H02P 2101/45* (2015.01)

(58) Field of Classification Search
CPC ...... H02P 27/06; H02P 23/14; H02P 2101/45; H02K 1/14; H02K 19/12; H02K 1/26; B60L 11/1811; B60L 11/1814; B60L 2220/54; Y02T 10/7005; Y02T 10/7072; Y02T 90/127; Y02T 90/14; Y10T 29/49002

See application file for complete search history.

(56) References Cited

U.S. PATENT DOCUMENTS

| | | | | |
|---|---|---|---|---|
| 9,843,278 | B2* | 12/2017 | Toba | ............... H02P 6/14 |
| 2011/0050174 | A1* | 3/2011 | King | ............... B60L 11/1811 |
| | | | | 320/134 |
| 2013/0069492 | A1* | 3/2013 | Rippel | ............... H02J 7/045 |
| | | | | 310/68 D |
| 2016/0152151 | A1* | 6/2016 | Yang | ............... B60L 11/1812 |
| | | | | 320/109 |

FOREIGN PATENT DOCUMENTS

| | | |
|---|---|---|
| JP | 2009-296843 A | 12/2009 |
| JP | 2011-015495 A | 1/2011 |
| KR | 10-2013-0068411 A | 6/2013 |
| KR | 10-2014-0071593 A | 6/2014 |
| KR | 2014-0100338 A | 8/2014 |
| KR | 20150002093 A | 1/2015 |
| KR | 20160010158 A | 1/2016 |
| KR | 2016-0060971 A | 5/2016 |

* cited by examiner

CHARGING SYSTEM USING WOUND ROTOR SYNCHRONOUS MOTOR

CROSS REFERENCE TO RELATED APPLICATION

This application claims the benefit of an earlier filing date and the right of priority under 35 U.S.C. § 119(a) from Korean Patent Application No. 10-2016-0140223, filed Oct. 26, 2016, the entire contents of which is incorporated by reference herein for all purposes.

BACKGROUND

1. Technical Field

The present disclosure relates to a charging system using a wound rotor synchronous motor, and more particularly, to a charging system using a wound rotor synchronous motor, capable of increasing a battery charging capacity.

2. Related Art

In recent years, due to serious global warming and environmental pollution concerns, eco-friendly vehicles have been actively developed to greatly reduce environmental pollution, and there is a growing market for these types of vehicles. The eco-friendly vehicles built throughout the world include (i) an electric vehicle including a motor, which generates driving force using electric energy, instead of an existing engine, which generates driving force by burning fossil fuel, (ii) a hybrid vehicle, and (iii) a plug-in hybrid vehicle. The eco-friendly vehicle techniques using electric energy are mainly used to drive motors by charging batteries within a vehicle from a grid. Thus, an eco-friendly vehicle using electric energy requires an on-vehicle charging circuit for charging a battery with electric energy supplied from a grid.

The on-vehicle charging circuit is necessary for charging the battery of the eco-friendly vehicle and may be embodied using various topologies. Most on-vehicle charging circuits include a high-frequency transformer, a filter for insulation, a plurality of switching elements, and a control module. Implementing separate on-vehicle charging circuits on eco-friendly vehicles unavoidably increases the cost and weight of the vehicle. Moreover, the weight and volume of eco-friendly vehicles may further increase because the transformers of on charging circuits typically use a magnetic circuit and the size of the transformers increases depending on capacity.

Accordingly, research and development is required to reduce the volume, weight, and cost of the eco-friendly vehicle increased due to the on-vehicle charging circuit included in the vehicle.

Unless otherwise indicated herein, the aspects described in this section are not prior art to the claims and are not admitted to be prior art by inclusion in this section.

Overview

Accordingly, the present disclosure is made keeping in mind the problems occurring in the related art, and the present disclosure describes a charging system using a wound rotor synchronous motor, capable of increasing a battery charging capacity while reducing the volume, weight, and/or cost of a vehicle increased due to an on-vehicle charging circuit.

In accordance with one aspect, a charging system using a wound rotor synchronous motor comprises an inverter configured to convert a direct current (DC) output of a battery into a plurality of alternating current (AC) signals having different phases, a wound rotor synchronous motor comprising a plurality of stator coils connected to receive the AC signals having different phases respectively, and a field coil configured to form a mutual inductance with the stator coils, the field coil being installed in a rotor to form a magnetic flux using a direct current output of the battery and being connected to a grid when the battery is being charged, a charging circuit connected in parallel between a connection end of the battery and the inverter and a connection end of the field coil of the wound rotor synchronous motor and the grid, and a controller configured to allow the battery and the field coil to be selectively insulated from each other in a charge mode in which electricity from the grid is applied to the field coil of the wound rotor synchronous motor.

When the current to be supplied for charging the battery is equal to or less than the current supplied through the charging circuit in the charge mode, the controller can allow the battery and the field coil to be insulated from each other so as to prevent charging current from being supplied to the battery through the field coil, and allow charging current to be supplied to the battery through the charging circuit.

When the power to be supplied for charging the battery exceeds the power supplied through the charging circuit in the charge mode, the controller can allow the battery and the field coil to be insulated from each other and control the inverter so as to transfer electricity the field coil receives from the grid to the stator coils, thereby charging the battery.

In the charge mode, the controller can allow the battery and the field coil to be insulated from each other, control the inverter so as to transfer electricity the field coil receives from the grid to the stator coils, allow charging power to be supplied to the battery through the charging circuit, and control charging power supplied to the battery through the field coil and the stator coils and charging power supplied to the battery through the charging circuit.

When the wound rotor synchronous motor rotates, the controller can allow the battery to be electrically connected to the field coil.

In the charge mode, the controller can derive a charging power command value for charging the battery with reference to a voltage of the battery, derive an input power command value based on an error between supply power actually supplied to the battery and the power command value, derive a sine component of an input current command value to the field coil by applying a maximum grid voltage value to the input current command value, derive a sine component of a d-axis current command value in the stator coils, based on an error between the input current command value and a sine component of a current actually input to the field coil, derive a cosine component of the d-axis current command value in the stator coils, based on an error between "0" and a cosine component of the current input to the field coil, derive a d-axis current command value in the stator coils, based on an error between the sine and cosine components of the d-axis current command value in the stator coils and a phase angle of electricity from the grid, derive a d-axis voltage command value and a q-axis voltage command value in the stator coils, based on the d-axis current command value and a q-axis current command value having a value of 0 in the stator coils, derive a three-phase voltage command value (rates) by converting the d-axis voltage command value and the q-axis voltage command value into a three-phase voltage, and control an on/off duty cycle of a switching element of the inverter in order to output the three-phase voltage command value ($V^*_{abcs}$).

In the charge mode, the controller can derive a charging power command value for charging the battery with reference to a voltage of the battery, derive an input power command value ($P^*_{in}$) based on an error between supply power actually supplied to the battery and the power command value, and calculate a sine component ($I^*d_{ss}$) and a cosine component ($I^*_{dsc}$) of a d-axis current command value in the stator coils using the following equations:

$$I^*_{dss} = -\frac{L'_f P^*_{in}}{L_{in}\left\{\frac{3}{2}\frac{1}{2}E_f\right\}},$$ [Equation A and B]

$$I^*_{dsc} = \frac{R'_f P^*_{in} 1\left\{\frac{3}{2}\frac{1}{2}E_f\right\} - E_f}{\omega_g L_m}$$

(where $L^*_f = (3/2)*(n_s/n_f)^2$, $n_s$ is the number of turns of stator coil, $n_f$ is the number of turns of field coil, $L_m$ is a mutual inductance between a stator d-axis and a field when viewed from a stator, $E_f$ is a value obtained by converting a maximum voltage value of a grid into a stator end, and $\omega_g$ is an angular velocity of grid power).

In addition, the controller can derive a d-axis current command value in the stator coils, based on the sine and cosine components of the d-axis current command value in the stator coils and a phase angle of the electricity provided by the grid, derive a d-axis voltage command value and a q-axis voltage command value in the stator coils, based on the d-axis current command value and a q-axis current command value having a value of zero (i.e., "0") in the stator coils, derive a three-phase voltage command value ($V^*_{abcs}$) by converting the d-axis voltage command value and the q-axis voltage command value into a three-phase voltage, and control an on/off duty cycle of a switching element of the inverter in order to output the three-phase voltage command value ($V^*_{abcs}$).

The charging system can further include a rectifier circuit unit for rectifying electricity from the grid, and a switching circuit unit for converting an output of the rectifier circuit unit into an alternating current having a predetermined frequency so as to provide the alternating current to the field coil.

The electricity from the grid can be directly applied to both ends of the field coil.

The charging system can further include a power factor correction circuit unit for correcting a power factor of the electricity from the grid, and a switching circuit unit for converting a current input to the power factor correction circuit unit into an AC signal having a predetermined frequency so as to provide the AC signal output by the power factor correction circuit unit to the field coil.

In accordance with another aspect, a charging system using a wound rotor synchronous motor comprises an inverter configured to selectively operate so as to output a plurality of alternating current (AC) signals having different phases by converting a direct current output of a battery or so as to provide a direct current output to the battery by converting a plurality of AC signals input to the inverter, a wound rotor synchronous motor comprising a plurality of stator coils connected to receive the AC signals having different phases from the inverter, and a field coil installed in a rotor so as to form a mutual inductance with the stator coils, a switch unit configured to selectively and electrically connect the battery to the field coil or to disconnect the battery from the field coil, a charging circuit connected in parallel between a connection end of the battery and the inverter and a connection end of the field coil of the wound rotor synchronous motor and a grid, and a controller configured to control a connection or disconnection state of the switch unit in a charge mode in which electricity from the grid is applied to the field coil of the wound rotor synchronous motor, wherein when the wound rotor synchronous motor is driven, the controller allows the switch unit to be in a connection state in order to drive the wound rotor synchronous motor using a magnetic flux generated in the field coil by the direct current output of the battery, and in the charge mode, the controller allows the switch unit to be in an disconnection state, and controls the charging circuit so as to supply charging power to the battery through the charging circuit or controls the inverter so as to transfer electricity the field coil receives from the grid to the stator coils, thereby supply charging power to the battery.

When the power to be supplied for charging the battery is equal to or less than the power supplied through the charging circuit in the charge mode, the controller can prevent the charging power from being supplied to the battery through the field coil, and allow the charging power to be supplied to the battery through the charging circuit.

When the power to be supplied for charging the battery exceeds the power supplied through the charging circuit in the charge mode, the controller can control the inverter so as to transfer electricity the field coil receives from the grid to the stator coils, thereby charging the battery.

In the charge mode, the controller can control charging power supplied to the battery through the field coil and the stator coils and charging power supplied to the battery through the charging circuit.

As apparent from the above description, in accordance with the charging system using a wound rotor synchronous motor having the above-mentioned structure, when the wound rotor synchronous motor provided in the vehicle rotates, the switching circuit (inverter circuit) is connected to the battery for driving the field coil, as when a typical motor is driven. In a charge mode for charging the battery, the switch unit (relay) is controlled to be in a disconnection state, so that the battery connected to the stator coil through the field coil can be charged with electricity from the grid. Therefore, by eliminating the need for a separate on-vehicle charging circuit, it is possible to charge the vehicle battery in the plug-in hybrid vehicle using the wound rotor synchronous motor in a less expensive manner and with a simpler configuration.

Furthermore, the charging system using a wound rotor synchronous motor makes it possible to increase a charging capacity because the typical on-vehicle charging circuit is added to the charging system using a wound rotor synchronous motor. Furthermore still, the charging system using a wound rotor synchronous motor makes it possible to perform high-efficiency charging through the charging circuit during typical charging and to expand a charge capacity without other additional circuits by controlling the wound rotor synchronous motor in a charge mode when fast charging is required.

BRIEF DESCRIPTION OF THE DRAWINGS

Example embodiments are described herein with reference to the following drawings.

DETAILED DESCRIPTION

A charging system using a wound rotor synchronous motor according to the example embodiments of the present disclosure is described below with reference to the accompanying drawings.

Figure 1:
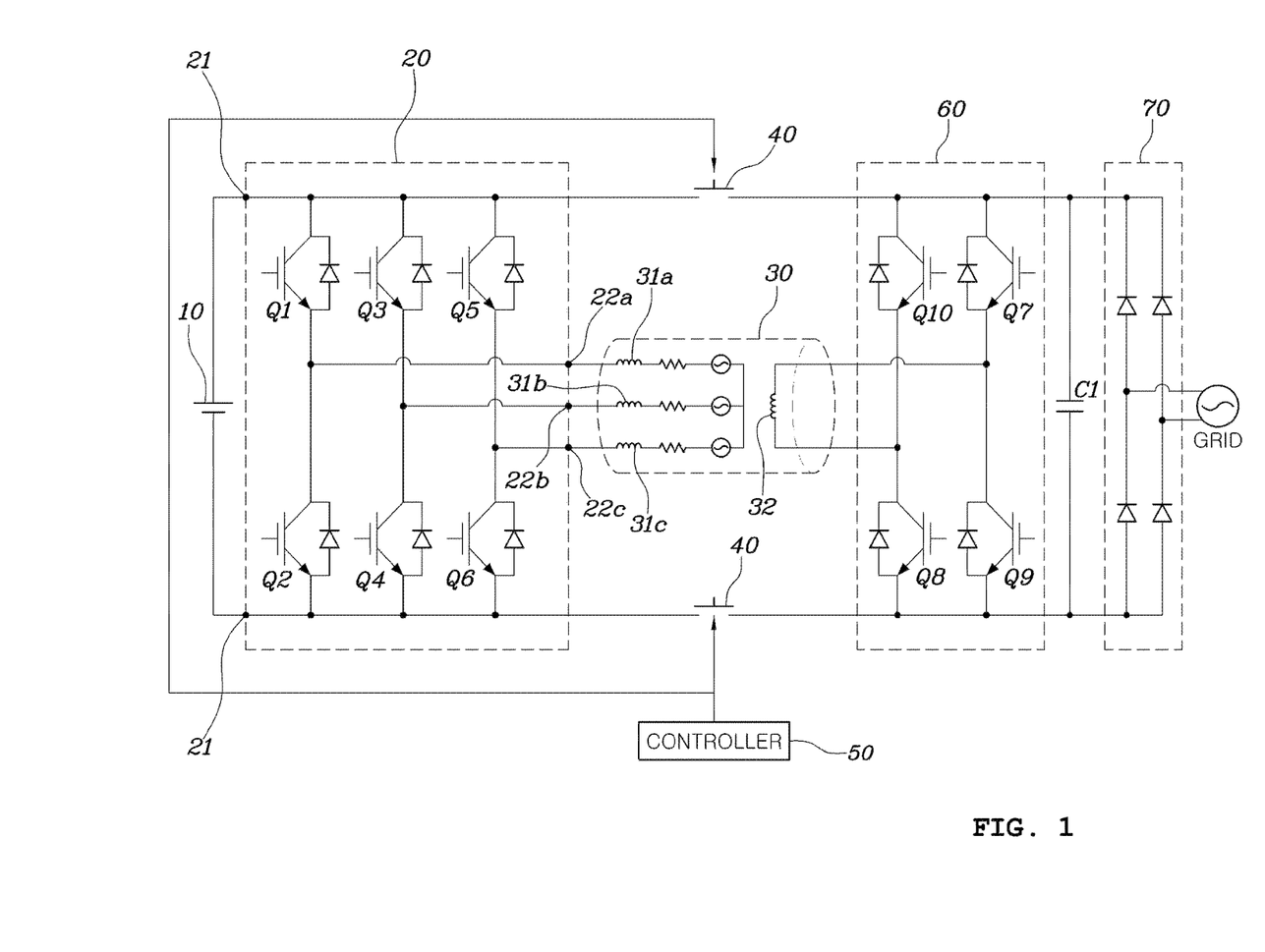
FIG. 1 is a circuit diagram illustrating a charging system using a wound rotor synchronous motor according to an example embodiment.

FIG. 1 is a circuit diagram illustrating a charging system using a wound rotor synchronous motor according to an example embodiment.

Referring to FIG. 1, the charging system using a wound rotor synchronous motor can include a battery 10, an inverter 20, a wound rotor synchronous motor 30, a switch unit 40, and a controller 50.

The battery 10 is an energy storage device for supplying electric current to a motor for driving thereof in an eco-friendly vehicle, such as an electric vehicle or a plug-in hybrid vehicle, including the motor which generates driving force for rotating wheels. The battery 10 applied to the eco-friendly vehicle is discharged when the motor is driven, and is charged with electric current supplied from an external grid.

The inverter 20 is a bidirectional inverter which is selectively operated so as to output a plurality of AC (alternating current) signals having different phases by converting the electric current output by the battery 10 or so as to output direct current electricity to the battery 10 by converting a plurality of AC signals.

The inverter 20 can have first input/output terminals 21 connected to the battery 10, and second input/output terminals 22a, 22b, and 22c connected to the motor 30. When the motor 30 is driven, the inverter 20 converts the electrical current supplied to the first input/output terminals 21 from the battery 10 into a plurality of AC signals having different phases using switching elements Q1, Q2, Q3, Q4, Q5, and Q6 (referred to hereinafter as "Q1 to Q6"), and respectively outputs the AC signals to the second input/output terminals 22a, 22b, and 22c. Because the techniques for driving the motor using three-phase power having a phase difference of 120° are typically applied, various example embodiments are described based on the inverter 20 and the three-phase motor 30 for performing three-phase power conversion.

The wound rotor synchronous motor 30 can include a plurality of stator coils 31a, 31b, and 31c (hereinafter referred to as "31a to 31c") to which a plurality of AC signals having different phases is input from the inverter 20, and a rotor having a field coil 32 which forms a mutual inductance with the stator coils 31a, 31b, and 31c and is magnetically coupled thereto.

The wound rotor synchronous motor 30 directly controls a magnetic flux using the field coil 32. Through such control of magnetic flux, the wound rotor synchronous motor 30 can output high torque in the intermediate/low speed region of the vehicle as in a permanent magnet synchronous motor, and can have characteristics suitable for high-speed driving as in an induction motor. Therefore, the wound rotor synchronous motor 30 is suitable as a motor applied to the eco-friendly vehicle.

The wound rotor synchronous motor 30 has an arm which can supply electric power from the battery 10 to the field coil 32 in order to control the magnetic flux of the field coil 32.

In the example embodiments, the charging system includes the switch unit 40 which can selectively and electrically connect or disconnect the battery 10 to or from the field coil 32 in order to use the wound rotor synchronous motor 30 for charging the battery 10.

The connection or disconnection state of the switch unit 40 can be controlled by the controller 50. For example, when a vehicle including the charging system is driven, the controller 50 allows the switch unit 40 to be in a connection state in order to drive the wound rotor synchronous motor 30 using the magnetic flux of the field coil 32 generated by the electric current from the battery 10. When the battery 10 is charged with electricity the field coil 32 receives from a grid, the controller 50 allows the switch unit 40 to be in a disconnection state in order to charge the battery 10 by transferring electricity the field coil 32 receives from the grid to the stator coils 31a, 31b, and 31c by the mutual inductance. That is, in the example embodiments, the state of the switch unit 40 differs between when the motor 30 is driven and when the battery 10 is being charged. When the motor 30 is driven, the switch unit 40 allows field winding to form a magnetic flux for driving the motor 30. When the grid is connected to charge the battery 10, the switch unit 40 electrically disconnects the battery 10 from the grid.

As shown in FIG. 1, the charging system comprises a single-phase output inverter 60 for supplying AC signals to the field coil 32, and the single-phase output inverter 60 can comprise a plurality of switching elements Q7, Q8, Q9, and Q10 (hereinafter referred to as "Q7 to Q10"). In addition, the charging system comprises a rectifier circuit 70 for rectifying electricity from the grid.

In FIG. 1, the switching elements Q1 to Q6 and Q7 to Q10 (hereinafter referred to as "Q1 to Q10") of the inverter 20 and the single-phase output inverter 60 can be turned on or off when the wound rotor synchronous motor 30 is driven or when the battery 10 is charged. The switching elements Q1 to Q10 can be controlled by the controller 50. The controller 50 can perform various types of calculations required to control the switch unit 40 and the operation of the wound rotor synchronous motor 30, and provides command signals in response to the calculation results to elements required for control.

In the example embodiment shown in FIG. 1, in the case where the battery 10 is charged, when the controller 50 first allows the switch unit 40 to be in an disconnection state and connects the grid to the rectifier unit 70, the grid voltage rectified by the rectifier unit 70 is applied to the single-phase output inverter 60. Here, when a DC (direct current) link capacitor C1 having low capacitance is applied to the embodiment, a voltage (having twice the frequency of the grid voltage), which is equal to the absolute value of the grid voltage, is applied to the field coil-side inverter 60. Because a current having the same frequency as the grid must flow in the field coil 32 in order to satisfy the power factor of the grid, a desired frequency can be generated by properly controlling the switching elements Q7 to Q10 of the field coil-side inverter 60.

When an AC signal is applied to the field coil 32, a current is induced in the stator coils 31a to 31c forming mutual inductance with the field coil 32, and the switching elements Q1 to Q6 of the inverter 20 are controlled so that the induced current is converted into a direct electrical current to be supplied to the battery 10 so as to charge the battery 10.

Figure 2:
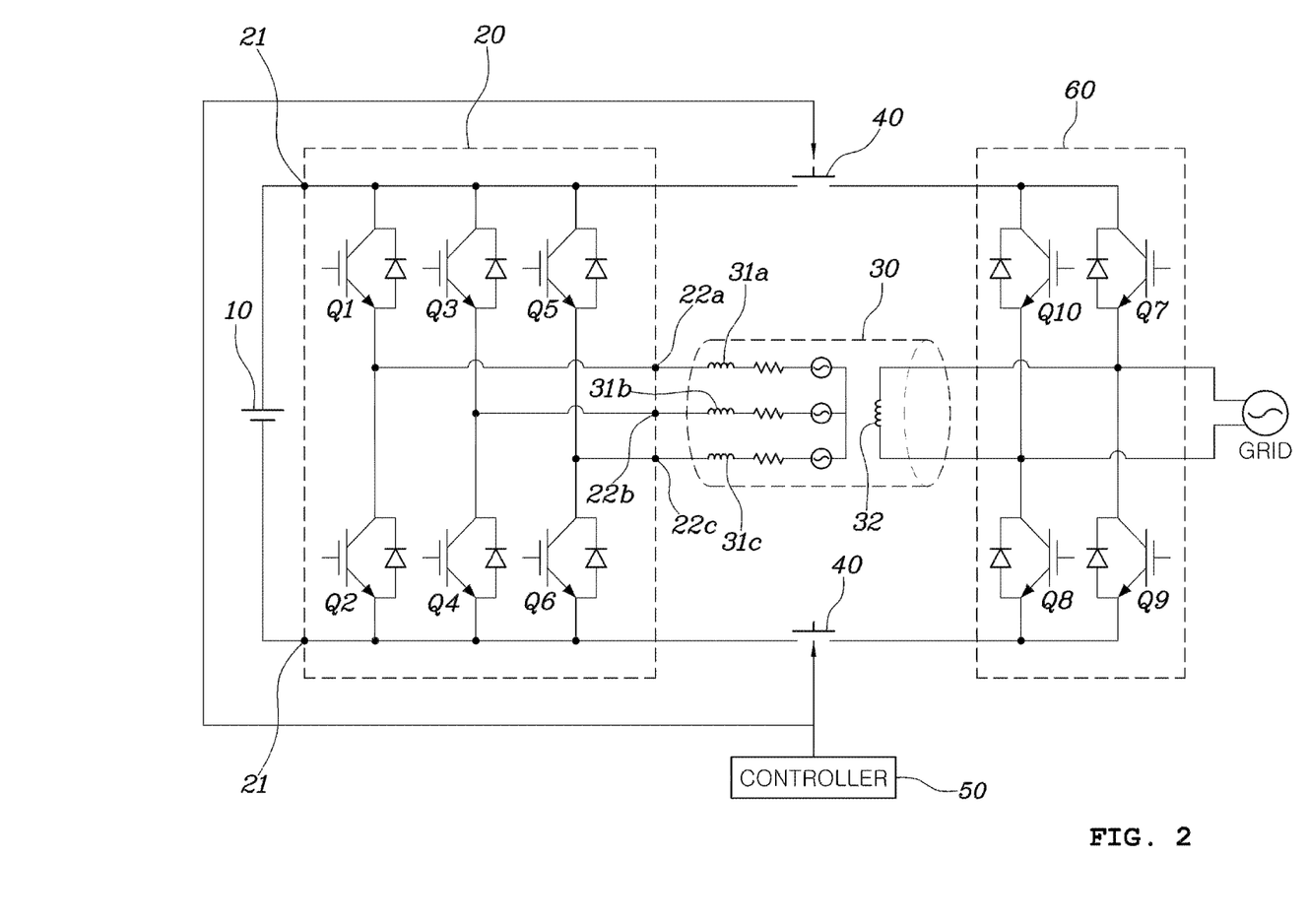
FIG. 2 and FIG. 3 are circuit diagrams illustrating a charging system using a wound rotor synchronous motor according to various example embodiments.
Figure 3:
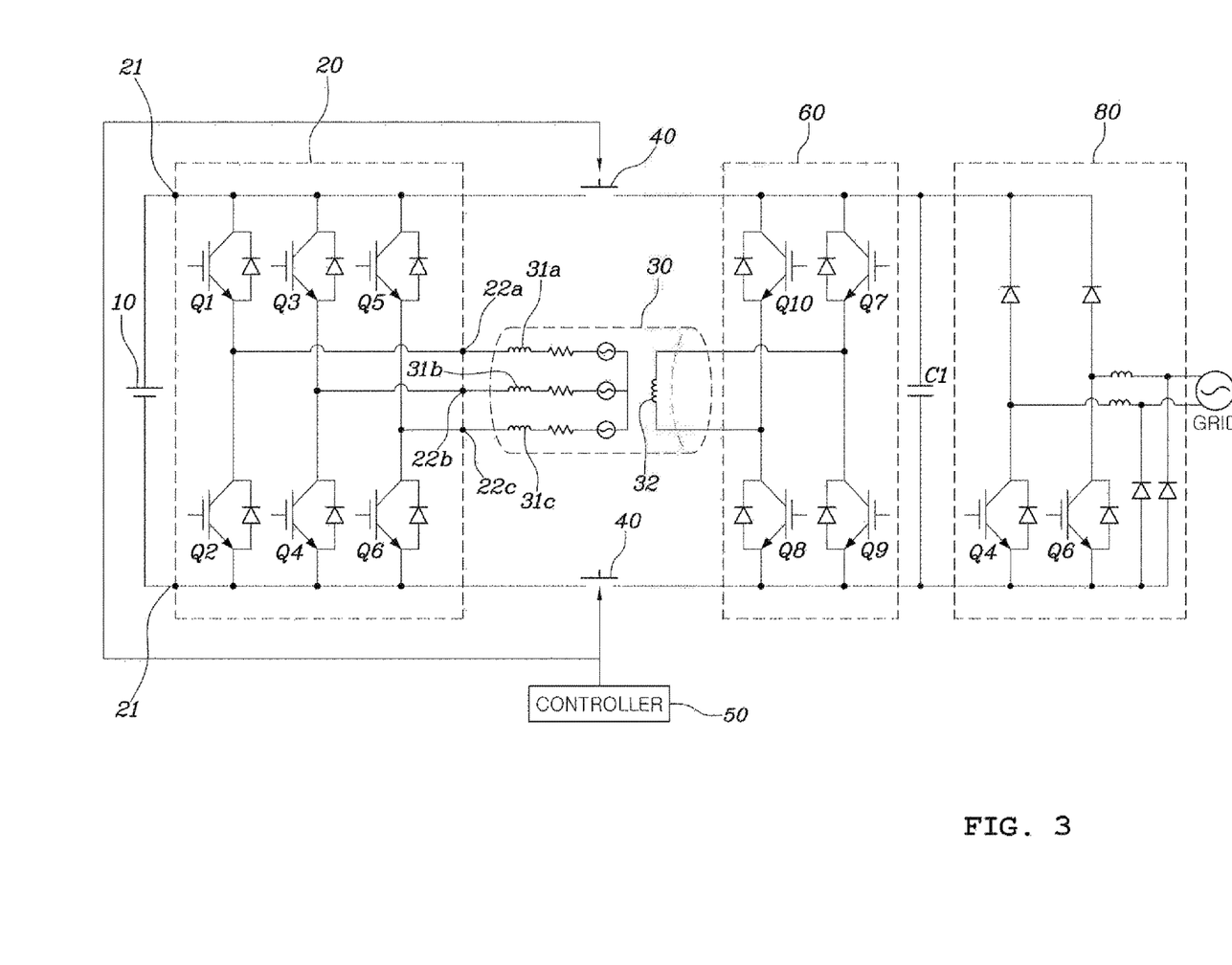

Next, FIG. 2 and FIG. 3 are circuit diagrams illustrating a charging system using a wound rotor synchronous motor 30 according to various example embodiments.

In the example embodiment shown in FIG. 2, the charging system has a structure in which a grid is directly connected to a field coil 32 of a wound rotor synchronous motor 30 without passing through a rectifier circuit. This structure can be embodied when the mutual inductance between the field coil 32 and stator coils 31a to 31c is sufficiently great. Components of the embodiment shown in FIG. 1, such as the rectifier circuit 70 and the capacitor C1 are not used in the embodiment shown in FIG. 2. Thus, the cost to manufacture the charging system shown in FIG. 2 may be reduced compared to the cost to manufacture the charging system shown in FIG. 1.

In the example embodiments shown in FIG. 1 and FIG. 2, because the voltage of the grid is input to the rotor in the same form, a power pulsation having twice the frequency of the grid must be transferred to the battery in order to satisfy the regulation (power factor) of the grid. This is because the filter circuit (capacitor) for suppressing pulsation is designed such that the action of the filter circuit is small in the process of transferring electric power from the grid to the battery 10.

In the example embodiment shown in FIG. 3, the charging system has a structure in which a capacitor C2 having relatively high capacitance and a power factor correction circuit 80 are provided between afield coil 32 and a grid.

In the embodiment shown in FIG. 3, a grid power pulsation can be rectified at the front end of the field coil 32 using the capacitor C2 having relatively high capacitance and the power factor correction circuit 80. Therefore, the electric power transferred to the battery 10 through the field coil 32 may not include the pulsation. In addition, because the frequency applied to the field coil 32 can be set as desired by controlling a field coil-side inverter 60, the charging system can be advantageous in terms of system design.

Figure 4:
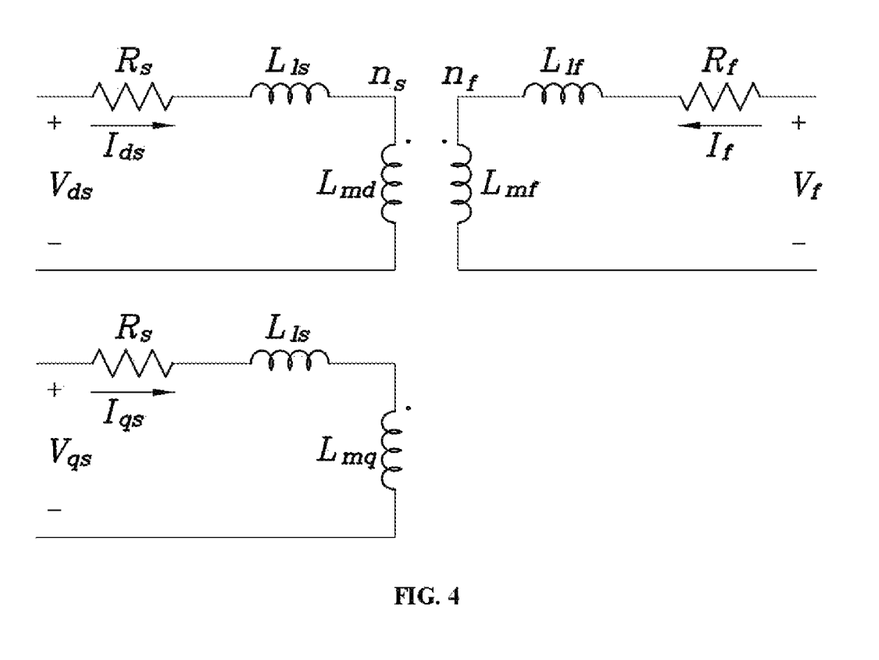
FIG. 4 and FIG. 5 are circuit diagrams obtained by modeling a wound rotor synchronous motor, applied to the example embodiments, as a d-q model.
Figure 5:
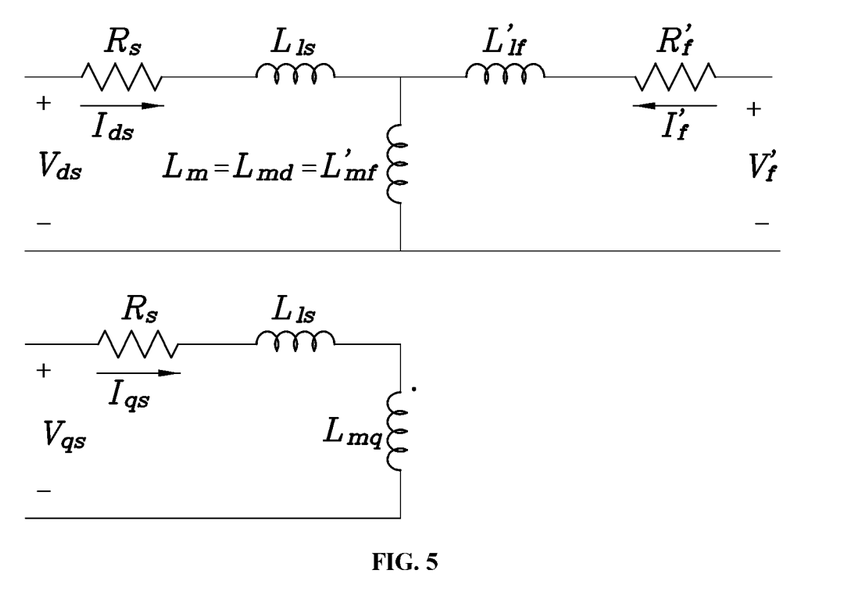

Next, FIG. 4 and FIG. 5 are circuit diagrams obtained by modeling the wound rotor synchronous motor, applied to example embodiments, as a d-q model.

As shown in FIG. 4, the three-phase coil of the stator end of the wound rotor synchronous motor applied to the example embodiments can be modeled as a direct-quadrature (d-q) model, and dr field coil of the rotor end can be modeled in the form in which it shares a mutual inductance with the d-axis coil of the stator modeled as a d-q model.

The wound rotor synchronous motor modeled as in FIG. 4 can be converted, into an equivalent circuit as shown in FIG. 5. When the modeling circuit of FIG. 4 is converted into the circuit shown in FIG. 5, the convened parameters are indicated by apostrophe (') and the parameter values can be expressed by the following Equation 1 according to the turns ratio.

$$I'_f = \frac{2}{3}\left(\frac{n_f}{n_s}\right)I_f, \ L'_{mf} = \frac{3}{2}\left(\frac{n_s}{n_f}\right)^2 L_{mf},$$ [Equation 1]

$$L'_{lf} = \frac{3}{2}\left(\frac{n_s}{n_f}\right)^2 L_{lf}, \ R'_f = \frac{3}{2}\left(\frac{n_s}{n_f}\right)^2 R_f, \ V'_{lf} = \left(\frac{n_s}{n_f}\right)V_f$$

Each of parameters indicated in FIG. 4 and FIG. 5 and Equation 1 is as follows:

$V_{ds}$: the d-axis voltage in the stator end;
$V_{qs}$: the q-axis voltage in the stator end;
$I_{ds}$: the d-axis current in the stator end;
$I_{qs}$: the q-axis current in the stator end;
$n_s$: the number of turns of coil in the stator end;
$R_s$: the d-axis and q-axis resistances in the stator end;
$L_{md}$: the mutual inductance of the d-axis coil in the stator end;
$L_{mq}$: the mutual inductance of the q-axis coil in the stator end;
$L_{ds}$: the d-axis and q-axis leakage inductances in the stator end;
$V_f$: the field coil-side input voltage;
$I_f$: the current flowing in the field coil;
$n_f$: the number of turns of field coil;
$R_f$: the field coil-side resistance;
$L_{lf}$: the field coil-side leakage inductance;
$L_{mf}$: the mutual inductance of the field coil; and
$L_m$ ($=L_{md}=L'L_{mf}$): the mutual inductance between stator d-axis and field coil.

The grid voltage is applied to the field coil 32 through the full bridge circuit 60 connected to the field coil 32. The amplitude of the applied grid voltage can be adjusted according to the turns ratio (in accordance with Equation 1) as the applied grid voltage is converted into the voltage in the equivalent circuit as in FIG. 5. The converted grid voltage ($V'_f$) can be expressed by the following Equation 2.

$$V'_f = E_f \sin(\omega_g t) = E_g \frac{n_p}{n_s} \sin(\omega_g t)$$ [Equation 2]

In Equation 2, $E_g$ refers to the maximum value of the actual grid voltage. $E_f$ refers to a value obtained by converting $E_g$ into the stator end, and $\omega_g$ refers to the voltage in the field coil 32, i.e. the angular velocity of the grid voltage. In this case, the voltage and current in the stator end and the field coil can be expressed by sine and cosine components as in the following Equation 3.

$$I'_f = I_{fs} \sin(\omega_g t) + (I_{fc} \cos(\omega_g t)$$

$$V_{ds} = E_{ss} \sin(\omega_g t) + E_{sc} \cos(\omega_g t), I_{ds} = I_{dss} \sin(\omega_g t) + I_{dsc} \cos(\omega_g t)$$

$$V_{qs} = 0, I_{qs} = 0$$ [Equation 3]

Each of parameters in Equation 3 is as follows:

$I_{fs}$: the size of the sine component of the current flowing in the field coil;
$I_{fc}$: the size of the cosine component of the current flowing in the field coil;
$E_{ss}$: the size of the sine component of the voltage applied to the field coil;
$E_{sc}$: the size of the cosine component of the voltage applied to the field coil;
$I_{dss}$: the size of the sine component of the d-axis current in the stator end; and
$I_{dsc}$: the size of the cosine component of the q-axis current in the stator end.

Figure 8:
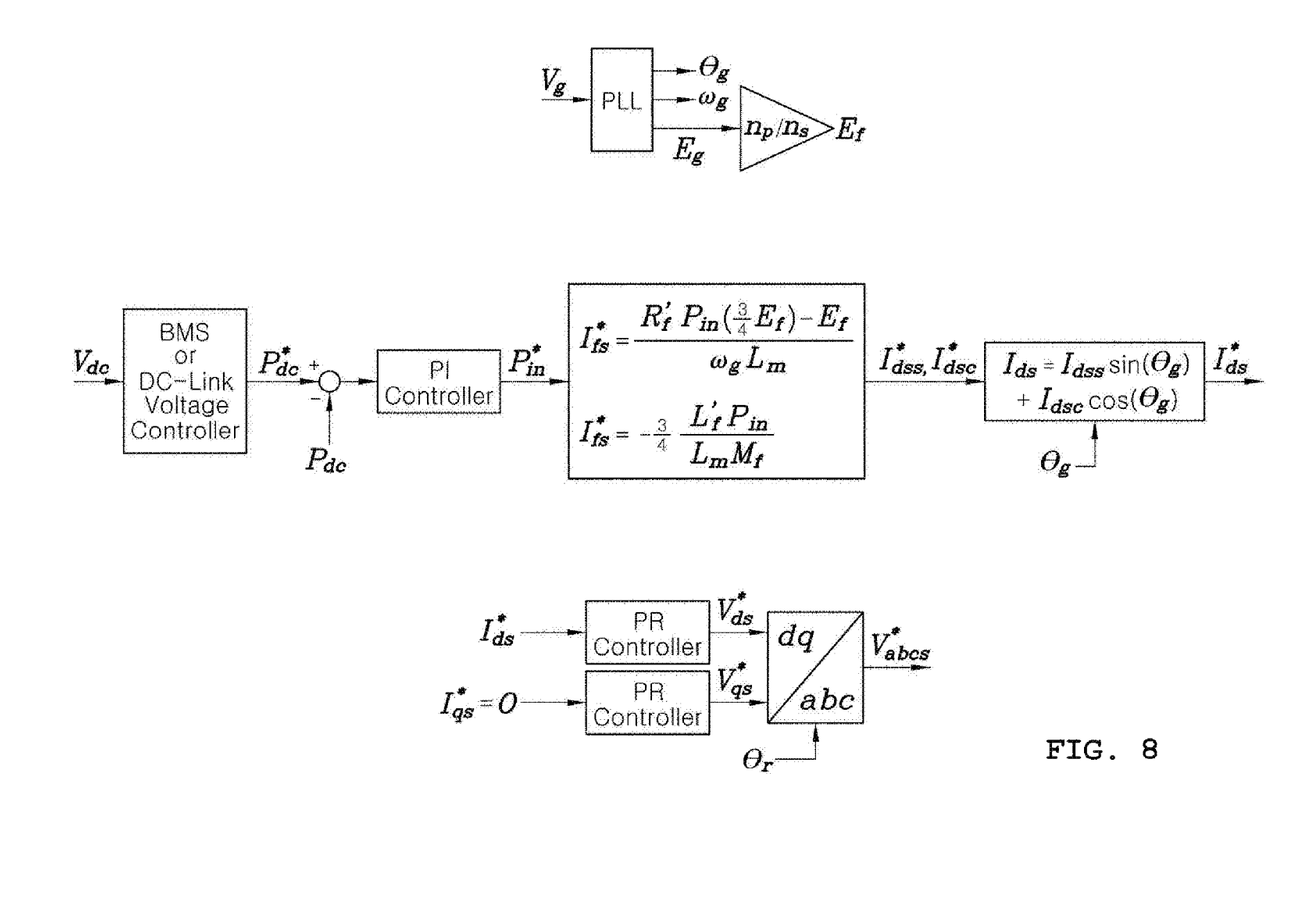

Here, the cosine component ($I_{fc}$) of the field current must be set as "0" in order to set the power factor of the field coil as "1", and the following Equation 4 must be satisfied by the equivalent circuit shown in FIG. 8.

$$V_{ds} = R_s I_{ds} + p(L_{ls} I_{ds} + L_m(I_{ds} + I'_f))$$

$$V'_f = R'_f I'_f + p(L'_{lf} I'_f + L_m(I_{ds} + I'_f)) \quad \text{[Equation 4]}$$

Because the voltage corresponding to the field coil in Equation 4 is determined by the above Equation 2, the following Equation 5 must be satisfied under a normal condition.

$$
\begin{aligned}
V'_f &= R'_f I'_f + p(L'_{lf} I'_f + L_m(I_{ds} + I'_f)) \quad \text{[Equation 5]} \\
&= R'_f \{ I_{fs} \sin(\omega_g t) + I_{fc} \cos(\omega_g t) \} + \\
&\quad \omega_g (L'_{lf} + L_m)(I_{fs} \cos(\omega_g t) - I_{fc} \sin(\omega_g t)) + \\
&\quad \omega_g L_m \{ I_{dss} \cos(\omega_g t) - I_{dsc} \sin(\omega_g t) \} \\
&= \sin(\omega_g t)\{ R'_f I_{fs} - \omega_g L_m I_{dsc} - \omega_g (L'_{lf} + L_m) I_{fc} \} + \cos(\omega_g t) \\
&\quad \{ R'_f I_{fc} + \omega_g (L'_{lf} + L_m) I_{fs} + \omega_g L_m I_{dss} \} \\
&= E_f \sin(\omega_g t)
\end{aligned}
$$

In order to satisfy the above Equation 5, the following Equations 6 and 7 must be satisfied, and thus the stator current can be obtained.

$$R'_f I_{fc} + \omega_g (L'_{lf} + L_m) I_{fs} + \omega_g L_m I_{dss} = 0 \quad \text{[Equation 6]}$$

$$I_{dss} = -\frac{R'_f I_{fc} + I_{fs} \omega_g L'_f}{\omega_g L_m} \approx -\frac{L'_f}{L_m} I_{fs}$$

$$R'_f I_{fs} - \omega_g L_m I_{dsc} - \omega_g (L'_{lf} + L_m) I_{fc} = E_f \quad \text{[Equation 7]}$$

$$I_{dsc} = \frac{R'_f I_{fs} - \omega_g L'_f I_{fc} - E_f}{\omega_g L_m} \approx \frac{R'_f I_{fs} - E_f}{\omega_g L_m}$$

The sine and cosine components of the d-axis current in the stator end determined by each of Equations 6 and 7 are estimated by setting the cosine component of the field coil as "0" ($I_f$=0).

The sine component of the d-axis current in the stator end can be determined by the sine component of the current in the field coil, i.e. by, the current for effective power. The required input power can be determined by the following Equation 8.

$$
P_{in} = \frac{3}{2}\frac{1}{2}(E_f I_{fs}) = \frac{3}{2}\frac{1}{2}\left(E_g I_{fs} \frac{N_p}{N_s}\right) \Longrightarrow I_{fs} = P_{in} \Big/ \left\{\frac{3}{2}\frac{1}{2} E_f\right\} \quad \text{[Equation 8]}
$$

In Equation 8, $P_{in}$ refers to the average value of the required input power.

The sine component of the d-axis current in the stator end can be determined as in the following Equation 9 using the above Equations 6 and 8.

$$I_{dss} = -\frac{L'_f P_{in}}{L_m \left\{ \frac{3}{2}\frac{1}{2} E_f \right\}} \quad \text{[Equation 9]}$$

In addition, the cosine component of the d-axis current in the stator end can be determined as in the following Equation 10 using the above Equations 7 and 8.

$$I_{dsc} = \frac{R'_f P_{in} \Big/ \left\{ \frac{3}{2}\frac{1}{2} E_f \right\} - E_f}{\omega_g L_m} \quad \text{[Equation 10]}$$

By means of the above Equations 8 to 10, the charging system using a wound rotor synchronous motor according to the example embodiments can perform a control operation described with reference to FIG. 6 to FIG. 8.

Figure 6:
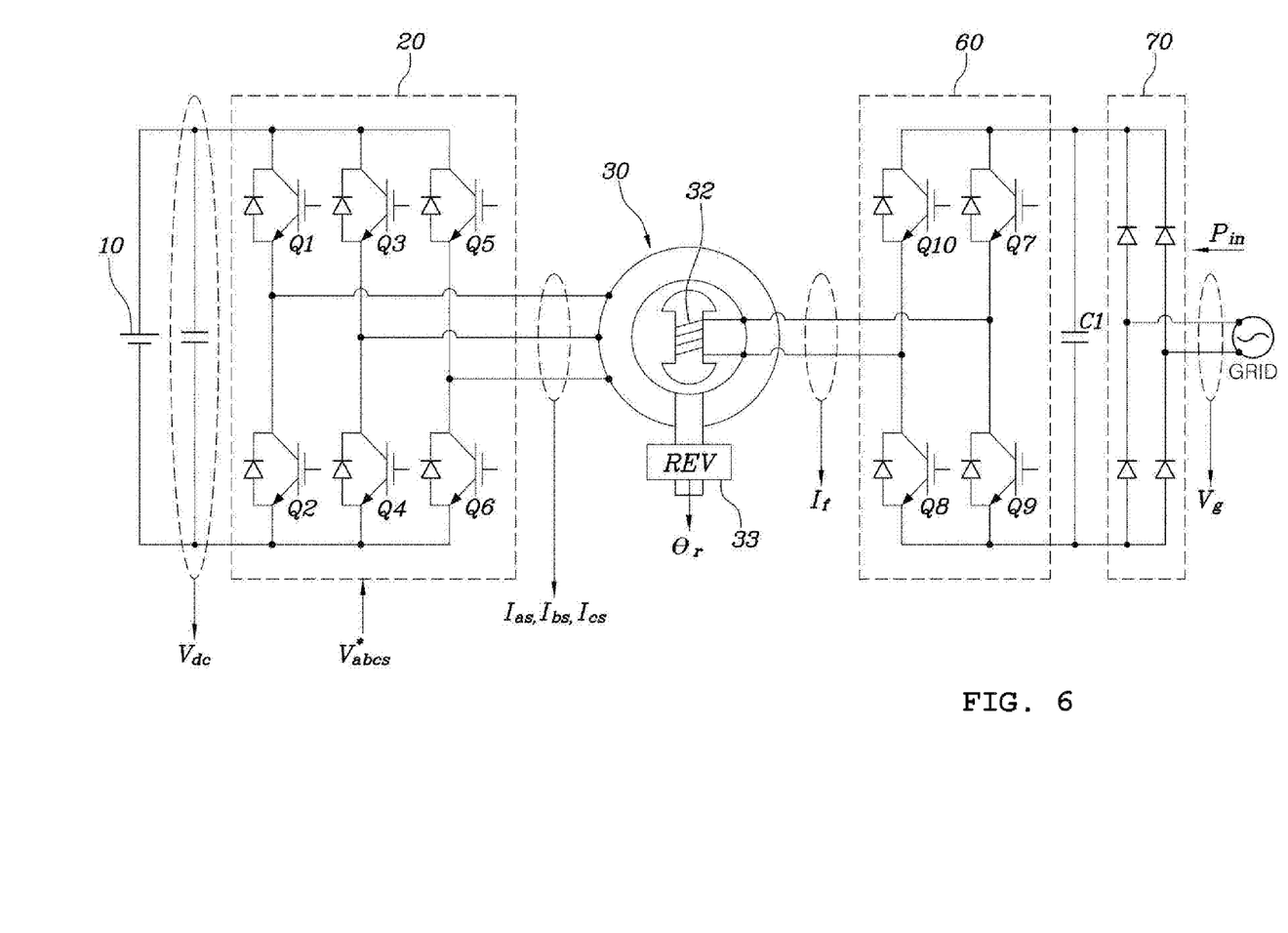
FIG. 6 is a circuit diagram symbolized for explaining the control operation of the charging system using a wound rotor synchronous motor according to the example embodiments.

FIG. 6 is a circuit diagram symbolized for explaining the control operation of the charging system using a wound rotor synchronous motor according to the example embodiment. FIG. 7 and FIG. 8 are control diagrams for explaining the control operation of the charging system using a wound rotor synchronous motor according to the example embodiments.

As shown in FIG. 6, the parameters required to control the charging system using a wound rotor synchronous motor according to the example embodiments can be obtained by a voltage sensor or a current sensor (not shown) applied to an actual realization circuit. That is, although not shown in FIG. 6, the charging system can be controlled based on the values obtained by the voltage sensor or the current sensor which is installed at a proper position in the circuit in order to detect a grid voltage ($V_g$), a current ($I_f$) provided to the field coil 32, the voltage ($V_{dc}$) of battery 10, or the like.

In the example embodiments, the control methods described below can be performed by the controller 50 to control the switch unit 40. The controller 50 can be implemented by hardware including a processor and a memory, and can store various parameters in the memory as occasion demands. In addition, the processor can perform calculations using the parameters stored in the external sensor or the memory according to the previous programmed algorithm.

First, the control method shown in FIG. 7 will be described.

As described above, the parameters required for control are detected, and other parameters can be calculated from some of the detected values. For example, a phase angle ($\theta_g$) of the grid power, an angular velocity ($\omega_g$), and a maximum value ($E_g$) of the grid voltage ($V_g$) can be derived from the grid voltage ($V_g$) detected using a PLL (Phase Loop Lock) circuit, and the maximum value ($E_g$) of the grid voltage ($V_g$) can be converted into "$E_f$" through the equivalent circuit shown in FIG. 5 and be derived.

In addition, a sine component ($I_{fs}$) and a cosine component ($I_{fc}$) of the input current can be calculated from the input current ($I_f$) and the angular velocity ($\omega_g$), which are input to the field coil 32 by a heterodyning method applied thereto.

When a vehicle BMS (Battery Management System) or a DC-link voltage controller receives the voltage ($V_{dc}$) of the battery 10 and outputs a charging power command value ($P^*_{dc}$) for charging the battery 10, an error between the charging power command value ($P^*_{dc}$) and an actual supply power ($P_{dc}$) to the battery 10 can be calculated based on the size of voltage/current actually provided to the battery 10, and an input power command value ($P^*_{in}$) can be calculated from the grid so as to remove the error by the control method such as PI (Proportional Integral) control.

Next, an input power command value ($P^*_{in}$), which is a value corresponding to ¾ of the maximum voltage value ($E_f$) converted into the input power command value ($P^*_{in}$)

using Equation 8, is calculated, and thus a sine component ($I^*_{fs}$) of the command value for current input to the field coil 32 is derived.

An error between the sine component ($I^*_{fs}$) of the command value for current input to the field coil 32 and the sine component ($I_{fs}$) of the current actually input to the field coil 32 is calculated, and the sine component ($I^*_{dss}$) of the d-axis current command value in the stator end can be derived by Equation 6 so as to remove the error by the control method such as PI control.

The cosine component ($I^*_{fc}$) of the command value for current input to the field coil 32 must be set as "0". Therefore, after an error between "0" and the cosine component ($I_{fc}$) of the current input to the field coil 32 is calculated, the cosine component (no of the d-axis current command value in the stator end can be derived by Equation 7 so as to remove the error by the control method such as PI control.

A d-axis current command value ($I^*_{ds}$) in the stator end is derived by Equation 3 by applying the sine and cosine components and phase angle of the d-axis current command value in the stator end thereto. A d-axis voltage command value ($V^*_{ds}$) and a q-axis voltage command value ($V^*_{qs}$) in the stator end can be derived by applying PR (Proportional Resonance) control to the derived d-axis current command value ($I^*_{ds}$) in the stator end and the q-axis current command value ($I^*_{qs}$) having the value of "0" in the stator end.

Next, when the d-axis voltage command value ($V^*_{ds}$) and the q-axis voltage command value ($V^*_{qs}$) in the stator end are converted into a three-phase voltage using the rotor angle ($\theta_r$) detected by a resolver 33 provided in the wound rotor synchronous motor, a three-phase voltage command value ($V^*_{abcs}$) can be finally derived.

A desired battery charging current can be supplied to the battery by controlling the on/off duty cycle of each of the switching elements Q1 to Q6 provided in the inverter 20 so as to output the derived three-phase voltage command value ($V^*_{abcs}$).

Next, the control method shown in FIG. 8 will be described.

Unlike the control method described with reference to FIG. 7 in which the input power command value ($P^*_{in}$) is calculated from the grid and the PI control is applied thereto, in the control method shown in FIG. 8, the sine component ($I^*_{dss}$) and cosine component ($I^*_{dsc}$) of the d-axis current command value in the stator end can be calculated by directly applying Equations 9 and 10 to the input power command value ($P^*_{in}$).

Figure 7:
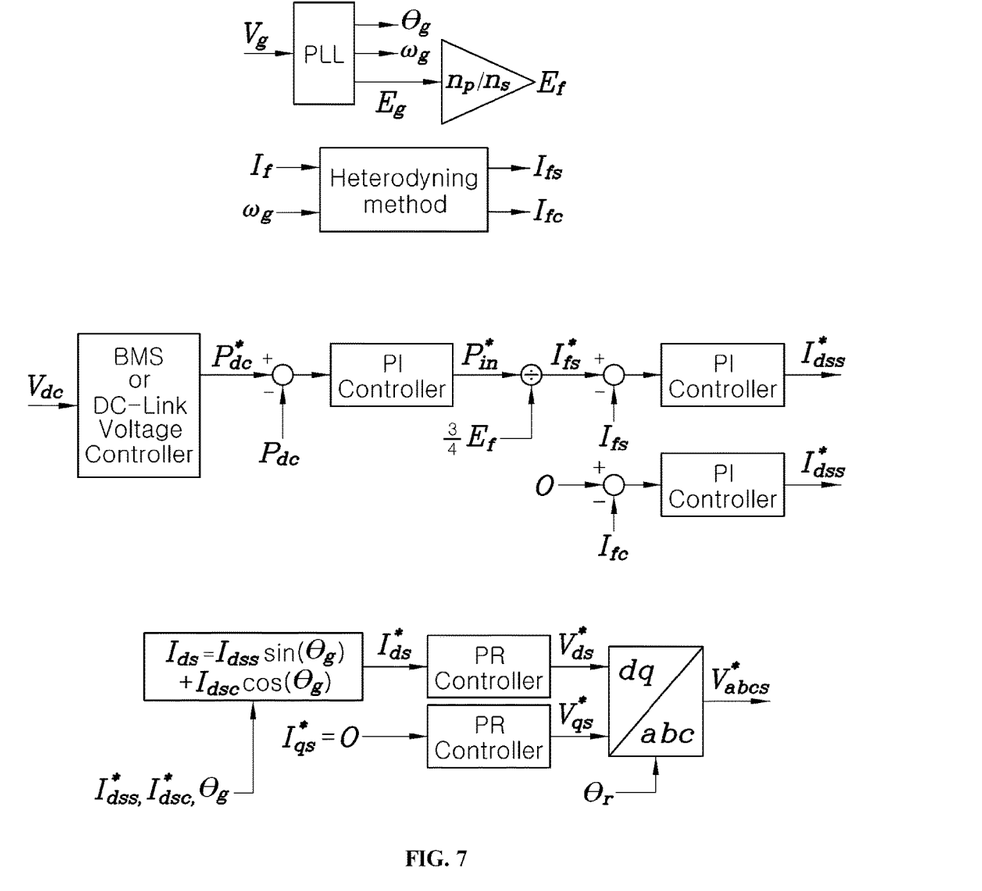
FIG. 7 and FIG. 8 are control diagrams for explaining the control operation of the charging system using a wound rotor synchronous motor according to the example embodiments.

After the sine component ($I^*_{dss}$) and cosine component ($I^*_{dsc}$) of the d-axis current command value in the stator end, a three-phase voltage command value (rates) is derived similar to the method of FIG. 7 so as to control the switching elements Q1 to Q6 of the inverter 20.

As described above, when the wound rotor synchronous motor provided in the vehicle rotates, the switching circuit (inverter circuit) is connected to the battery for driving the field coil in the example embodiments. On the other hand, in a charge mode for charging the battery, the switch unit (relay) is controlled to be in a disconnection state, so that the battery connected to the stator coil through the field coil can be charged with electricity from the grid. The field coil forms a mutual inductance with the stator coil in the state in which the motor is not driven, thereby forming a transformer. Therefore, when the drive circuit of the field coil is separated using the circuit configured by the battery and the relay, it is possible to obtain insulation characteristics. This structure is suitable for an on-vehicle charger that must have insulation characteristics for safety.

Accordingly, because the on charger circuit and the circuit required for the wound rotor synchronous motor including the field coil, which are individually used, are incorporated in the example embodiments, it is possible to simplify the configuration of the system.

Thus, according to the example embodiments, it is possible to realize the on-vehicle charger in the plug-in hybrid vehicle using the wound rotor synchronous motor with cheap price and simple configuration.

Figure 9:
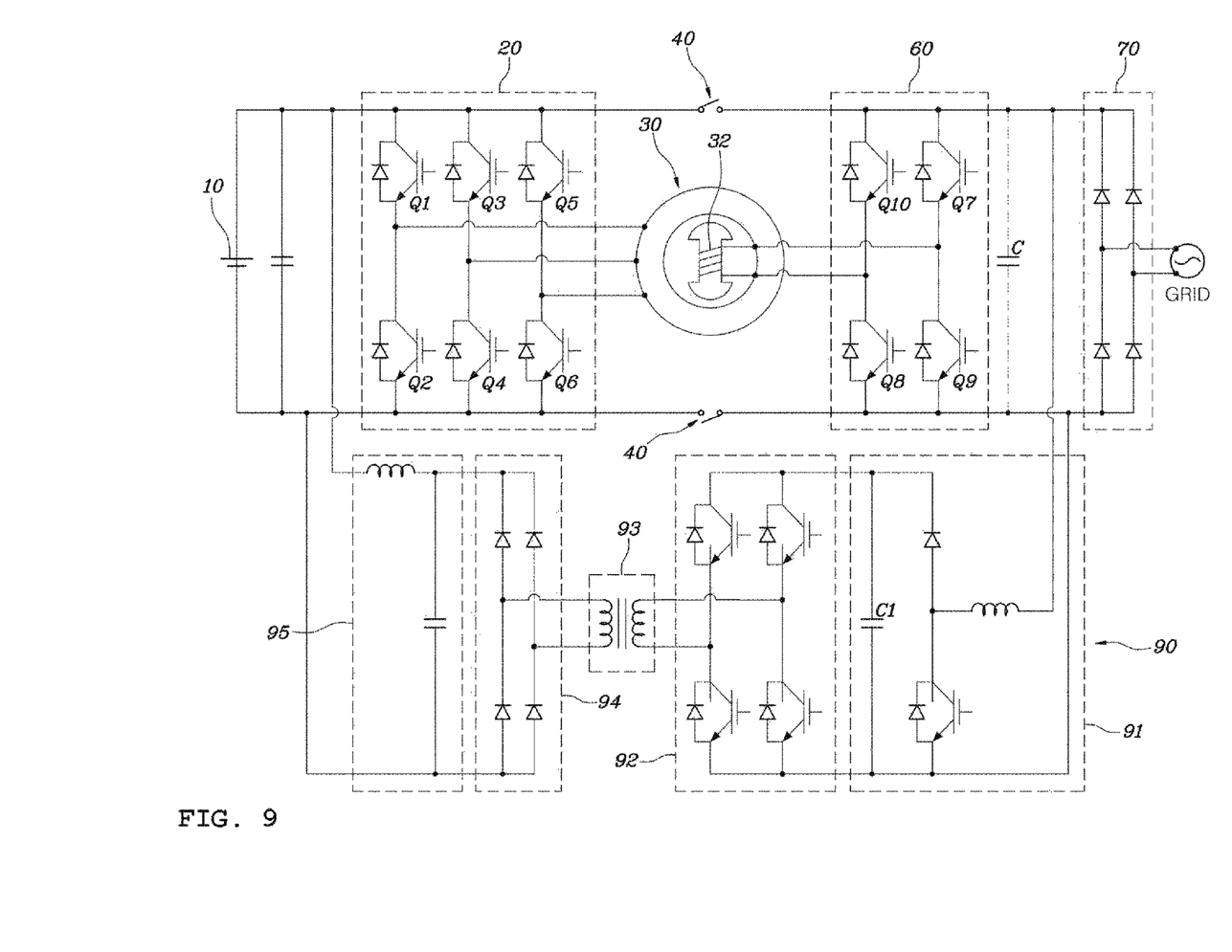
FIG. 9 is a circuit diagram illustrating a charging system using a wound rotor synchronous motor according to a further example embodiment, and particularly illustrating a structure in which the typical charger circuits according to the example embodiment of FIG. 1 are connected in parallel.

FIG. 9 is a circuit diagram illustrating a charging system using a wound rotor synchronous motor according to a further example embodiment, and particularly illustrating a structure in which the typical charger circuits according to the embodiment of FIG. 1 are connected in parallel.

As shown in FIG. 9, the charging system according to the further example embodiment has a structure in which a typical on-vehicle charging circuit 90 is added in parallel between the grid and the battery 10 of the charging system using a wound rotor synchronous motor described with reference to FIG. 1 to FIG. 8. That is, the on-vehicle charging circuit 90 can be connected in parallel between the grid and the battery 10, and includes a power factor correction circuit unit 91, which is connected to a rectifier unit 70 connected to the grid, a bridge circuit unit 92, which converts the power of the power factor correction circuit unit 91 into high-frequency AC power, a transformer unit 93, which insulates an input/output terminal while converting the power of the bridge circuit unit 92, a rectifier unit 94, which converts the AC power converted by and output from the transformer unit 93 into DC power, and a filter unit 95, which filters the power converted by the rectifier unit 94 and provides the filtered power to a battery.

In accordance with this example embodiment, when the vehicle is driven, the controller 50 allows the switch unit 40 to be in a connection state in order to drive all of the stator coils 31a, 31b, and 31c and the field coil 32 of the wound rotor synchronous motor 30 by the electric power supplied from the battery 10. In addition, when the battery 10 is charged, the controller 50 allows the switch unit 40 to be in an disconnection state in order to insulate the field coil 32 from the battery 10. When the grid is connected, the wound rotor synchronous motor 30 is controlled in a charge mode in order to charge the battery 10 and simultaneously charge the battery 10 through the additional on-vehicle charging circuit 90 connected in parallel. In this case, the controller 50 can control the charging power supplied to the battery 10 by the wound rotor synchronous motor 30 and the charging power supplied to the battery 10 by the on-vehicle charging circuit 90, regarding various conditions.

In another example, when a typical battery is to be charged slowly, the controller 50 allows the switch unit 40 to be in an disconnection state so as to maintain the insulation between the battery 10 and the grid and to prevent the wound rotor synchronous motor 30 from operating in a charge mode, with the consequence that the battery can be charged through the typical on-vehicle charging circuit 90. Because the on-vehicle charging circuit 90 can be designed as a high-efficiency circuit optimized for charging the battery, it is possible to charge the battery with high efficiency, compared to when the wound rotor synchronous motor 30 is operating in a charge mode. Meanwhile, when the battery is to be charged more quickly, the controller 50 allows the switch unit 40 to be in a disconnection state and properly controls the inverter 20 and the field coil-side inverter 60, thereby enabling electric power to be additionally supplied to the battery 10 even through the wound rotor synchronous motor 30.

In the example embodiments, the typical on-vehicle charging circuit 90 is added to the charging system using the wound rotor synchronous motor 30. Therefore, it is possible to perform high-efficiency charging through the charging circuit 90 during typical charging, to expand a charge capacity without other additional circuits by controlling the wound rotor synchronous motor 30 in a charge mode when fast charging is required, and to selectively control the charging power provided through the wound rotor synchronous motor 30 and the charging power provided through the charging circuit 90, regarding various charging conditions.

Example embodiments have been disclosed for illustrative purposes. Those skilled in the art will appreciate that various modifications, additions and substitutions are possible, without departing from the scope and spirit of the invention, which is defined by the claims.

What is claimed is:

1. A charging system using a wound rotor synchronous motor, comprising:
   an inverter configured to convert a direct current output of a battery into a plurality of alternating current (AC) signals having different phases;
   a wound rotor synchronous motor comprising a plurality of stator coils connected to receive the AC signals having different phases respectively, and a field coil configured to form a mutual inductance with the stator coils, the field coil being installed in a rotor to form a magnetic flux using a direct current output of the battery and being connected to a grid when the battery is charged;
   a charging circuit connected in parallel between a connection end of the battery and the inverter and a connection end of the field coil of the wound rotor synchronous motor and the grid; and
   a controller configured to allow the battery and the field coil to be selectively insulated from each other in a charge mode in which electricity from a grid is applied to the field coil of the wound rotor synchronous motor;
   wherein, in the charge mode, the controller controls charging power supplied to the battery through the field coil and the stator coils, and the controller controls charging power supplied to the battery through the charging circuit.

2. The charging system according to claim 1, wherein when the power to be supplied for charging the battery is equal to or less than the power supplied through the charging circuit in the charge mode, the controller allows the battery and the field coil to be insulated from each other so as to prevent charging power from being supplied to the battery through the field coil, and allows charging power to be supplied to the battery through the charging circuit.

3. The charging system according to claim 1, wherein when the power to be supplied for charging the battery exceeds the power supplied through the charging circuit in the charge mode, the controller allows the battery and the field coil to be insulated from each other and controls the inverter so as to transfer electricity the field coil receives from the grid to the stator coils, thereby charging the battery.

4. The charging system according to claim 1, wherein, in the charge mode, the controller allows the battery and the field coil to be insulated from each other, controls the inverter so as to transfer electricity the field coil receives from the grid to the stator coils, allows charging power to be supplied to the battery through the charging circuit, and controls charging power supplied to the battery through the field coil and the stator coils and charging power supplied to the battery through the charging circuit.

5. The charging system according to claim 1, wherein the controller is configured to allow the battery to be electrically connected to the field coil when the wound rotor synchronous motor rotates.

6. The charging system according to claim 3, wherein in the charge mode:
   the controller derives a charging power command value for charging the battery with reference to a voltage of the battery;
   the controller derives an input power command value based on an error between supply power actually supplied to the battery and the charging power command value;
   the controller derives a sine component of an input current command value to the field coil by applying a maximum grid voltage value to the input current command value;
   the controller derives a sine component of a d-axis current command value in the stator coils, based on an error between the input current command value and a sine component of a current input to the field coil, and derives a cosine component of the d-axis current command value in the stator coils, based on an error between "0" and a cosine component of the current input to the field coil;
   the controller derives a d-axis current command value in the stator coils, based on an error between the sine and cosine components of the d-axis current command value in the stator coils and a phase angle of the grid power;
   the controller derives a d-axis voltage command value and a q-axis voltage command value in the stator coils, based on the d-axis current command value and a q-axis current command value having a value of 0 in the stator coils;
   the controller derives a three-phase voltage command value ($V^*_{abcs}$) by converting the d-axis voltage command value and the q-axis voltage command value into a three-phase voltage; and
   the controller controls an on/off duty cycle of a switching element of the inverter in order to output the three-phase voltage command value ($V^*_{abcs}$).

7. The charging system according to claim 3, wherein in the charge mode:
   the controller derives a charging power command value for charging the battery with reference to a voltage of the battery;
   the controller derives an input power command value ($P^*_{in}$) based on an error between supply power actually supplied to the battery and the power command value;
   the controller calculates a sine component ($I^*_{dss}$) and a cosine component ($I^*_{dsc}$) of a d-axis current command value in the stator coils using the following equations, $$I^*_{dss} = -\frac{L'_f P^*_{in}}{L_m \left\{\frac{3}{2}\frac{1}{2}E_f\right\}}, \quad I^*_{dsc} = \frac{R'_f P^*_{in} / \left\{\frac{3}{2}\frac{1}{2}E_f\right\} - E_f}{\omega_g L_m}$$

(where $L'_f (3/2)*(n_s/n_f)^2$, $n_s$: the number of turns of stator coil, $n_f$: the number of turns of field coil, Lm: a mutual inductance between a stator d-axis and a field when viewed from a stator, $E_f$: a value obtained by converting a maximum voltage value of a grid into a stator end, and $\omega_g$ is an angular velocity of grid power);

the controller derives a d-axis current command value in the stator coils, based on the sine and cosine components of the d-axis current command value in the stator coils and a phase angle of the grid power;

the controller derives a d-axis voltage command value and a q-axis voltage command value in the stator coils, based on the d-axis current command value and a q-axis current command value having a value of 0 in the stator coils;

the controller derives a three-phase voltage command value ($V^*_{abcs}$) by converting the d-axis voltage command value and the q-axis voltage command value into a three-phase voltage; and the controller controls an on/off duty cycle of a switching element of the inverter in order to output the three-phase voltage command value ($V^*_{abcs}$).

8. The charging system according to claim 1, further comprising:
a rectifier circuit unit configured to rectify electricity from the grid; and
a switching circuit unit configured to convert an output of the rectifier circuit unit into an AC signal having a predetermined frequency and to provide the AC signal having the predetermined frequency to the field coil.

9. The charging system according to claim 1, wherein electricity from the grid is directly applied to both ends of the field coil.

10. The charging system according to claim 1, further comprising;
a power factor correction circuit unit configured to correct a power factor of electricity from the grid; and
a switching circuit unit configured to convert an output of the power factor correction circuit unit into an AC signal having a predetermined frequency and to provide the AC signal having the predetermined frequency to the field coil.

11. A charging system using a wound rotor synchronous motor, comprising:
an inverter configured to selectively operate so as to output a plurality of alternating current (AC) signals having different phases by converting a direct current output of a battery or so as to provide a direct current output to the battery by converting a plurality of AC signals input to the inverter;
a wound rotor synchronous motor comprising a plurality of stator coils connected to receive the AC signals having different phases from the inverter, and a field coil installed in a rotor so as to form a mutual inductance with the stator coils;
a switch unit configured to selectively and electrically connect the battery to the field coil or to disconnect the battery from the field coil;
a charging circuit connected in parallel between a connection end of the battery and the inverter and a connection end of the field coil of the wound rotor synchronous motor and a grid; and
a controller configured to control a connection or disconnection state of the switch unit in a charge mode in which electricity from the grid is applied to the field coil of the wound rotor synchronous motor,
wherein when the wound rotor synchronous motor is driven, the controller allows the switch unit to be in a connection state in order to drive the wound rotor synchronous motor using a magnetic flux generated in the field coil by the direct current output of the battery, and in the charge mode, the controller allows the switch unit to be in an disconnection state, and controls the charging circuit so as to supply charging power to the battery through the charging circuit or controls the inverter so as to transfer the electricity the field coil receives from the grid to the stator coils, thereby supply charging power to the battery,
wherein, in the charge mode, the controller controls charging power supplied to the battery through the field coil and the stator coils, and the controller controls charging power supplied to the battery through the charging circuit.

12. The charging system according to claim 11, wherein when the power to be supplied for charging the battery is equal to or less than the power supplied through the charging circuit in the charge mode, the controller prevents the charging power from being supplied to the battery through the field coil, and allows the charging power to be supplied to the battery through the charging circuit.

13. The charging system according to claim 11, wherein when the power to be supplied for charging the battery exceeds the power supplied through the charging circuit in the charge mode, the controller controls the inverter so as to transfer electricity the field coil receives from the grid to the stator coils, thereby charging the battery.

* * * * *